United States Patent Office 3,442,818
Patented May 6, 1969

3,442,818
EMULSIFIERS FOR AGRICULTURAL PESTICIDES
Keith Liddell Johnson, Park Forest, Ill., assignor to Swift & Company, Chicago, Ill., a corporation of Illinois
No Drawing. Filed Mar. 12, 1965, Ser. No. 439,424
Int. Cl. B01f *17/00, 17/12, 17/40*
U.S. Cl. 252—353                       8 Claims

ABSTRACT OF THE DISCLOSURE

A process with compositions for preparing emulsifiers, particularly useful for agricultural pesticides, comprising the combination of two materials of similar ionic type; such as, a mixture of alkaxylated alkyl phenols and/or fatty alcohols which have been alkoxylated to different levels with a third material of dissimilar ionic type; such as, an alkylated aromatic sulfonate to produce an unexpected superior performance.

---

This invention relates to new emulsifying and dispersing agents which are particularly useful in obtaining rapid and full distribution of agricultural toxicants. More specifically, the present invention relates to emulsifiers prepared by the combination of a mixture of alkoxylated nonionics with an anionic material.

Within the past few years there has been a rapid growth in the field of agricultural toxicants, such as pesticides, special fertilizers, disinfectants, herbicides, fungicides, rodenticides, germicides, and the like. Historical toxicants, for example, lime-sulfur, lead arsenate, nicotine, etc., have been largely replaced by materials such as: DDT (dichloro-diphenyl-trichloroethane), 2,4-D (2,4 dichloro-phenoxy-acetic acid), 2,4,5-T (2,4,5-trichloro-phenoxy-acetic acid), Aldrin (1,2,3,4,10,10-hexachloro-1,4,4a,5,8,8a-hexahydro-1,4,5,8-dimethano-napthalene), Chlorodane (1,2,4,5,6,7,8,8 - octachloro - 2,3,3a,4,7,7,7a - hexahydro-4,7-methanoidene), Dieldrin (1,2,3,4,10,10 - hexachloro - 6,7-epoxy-1,4,4a,5,6,7,8,8a - octahydro - 1,4,5,8-dimenthano-naphthalene) and the isomer Endrin, Toxaphene (chlorinated camphene containing 67–69% chlorine) Chloranil (2,3,5,6-tetrachloro-p-benzoquinone), and the like.

As a general practice, these newer toxicants are sold in a concentrate comprising the toxicant, a carrier solvent and an emulsifier. This concentrate is then dispersed or dissolved in aqueous solution immediately prior to application to the material being treated. It can readily be seen that the feasibility of such a system depends greatly upon the emulsifier which is present in the concentrate.

Emulsifiers presently used for the above purpose generally consist of a mixture of a non-aqueous nature containing alkaline earth or amine alklybenzene sulfonates with a poly-alkylene glycol alkyl or alkyl aryl ether or ester. In order that these emulsifiers may achieve optimum performance regardless of the varying hydrophobic or hydrophilic nature of the active ingredient and/or its carrier solvent, the ratio between the ionic and non-ionic components is generally varied from system to system. The non-ionic components of such systems are generally prepared by condensing ethylene oxide with a hydrophobic substrate such as an alkyl phenol, a fatty acid, a fatty alcohol, or an alkyl mercaptan. Although these emulsifying agents have met with some degree of success, there is a continuing demand in the industry for emulsifiers which will facilitate the production of improved uniform solutions or dispersions of agricultural toxicant concentrates.

Thus, it is an object of the present invention to provide an improved process for preparing an improved emulsifier for agricultural toxicants.

It is a further object of the present invention to provide an improved process for preparing an improved agricultural toxicant concentrate.

It is a further object of the present invention to prepare an improved emulsifier for agricultural toxicants.

It is a further object of the present invention to prepare an improved agricultural toxicant concentrate which will be readily dispersible in an aqueous medium.

Additional objects, if not specifically set forth herein, will be readily apparent to those skilled in the art from the following detailed description of the invention.

Generally, the present invention relates to the preparation and use of agricultural emulsifying agents which compromise an alkylated aromatic sulfonate in combination with a mixture of alkoxylated alkyl phenols or fatty alcohols which have been alkoxylated to different levels. Surprisingly, it has been found that the combination of these three essential ingredients results in an emulsifier which exhibits properties far superior to emulsifiers which contain an alkylated aromatic sulfonate in combination with a single alkoxylated alkyl phenol or fatty alcohol. It appears that a ternary synergism results from this essential combination.

More specifically, the present invention contemplates the preparation of an agricultural emulsifier by combining phenols or alcohols which have been alkoxylated to different levels with an alkylated aromatic sulfonate. The alkoxylated phenols and fatty alcohols may be prepared by alkoxylating quantities of the same alkyl phenol or fatty alcohol to different alkoxy levels, or by alkoxylating two different alkyl phenols or two different alcohols to different alkoxy levels.

The non-ionic components, which are generally designated as alkyl or alkyl aryl polyoxyalkylene glycol ethers or esters, operable in the present invention include alkyl phenols and fatty alcohols which have been reacted with from about 55 to 85 weight percent ethylene oxide. As a preferred embodiment, those compounds prepared by reacting an alkyl phenol or fatty alcohol with from about 65 to about 75 weight percent ethylene oxide have been found to be most useful in the present invention. Examples of the alkyl or alkyl aryl polyoxyalkylene glycol ethers and esters which are contemplated by the present invention include the polyoxyethylene glycol and mixed polyoxy-propylene-polyoxyethylene glycol derivatives of nonyl phenol, dinonyl phenol, iso-octyl phenol, di-iso butyl phenol, p-n-butyl phenol, n-octyl decyl phenol, tallow alcohol, oleyl alcohol and the like. Generally, the phenols used in the preparation of the alkyl aryl polyoxyalkylene glycol ethers and esters should contain alkyl radicals totaling at least 7 carbon atoms. Of the alkyl phenols contemplated by the present invention, the mono and di-alkyl phenols having from about 9 to about 24 carbon atoms in the carbon chains have been found to be most applicable. Fatty alcohols having from 8 to 22 carbon atoms have also been found to be of particular value for this purpose, with unsaturated tallow alcohol being especially valuable.

The alkylated aromatic sulfonates used in combination with the above non-ionic mixtures are within the general knowledge of those skilled in the art and include mahogany sulfonates, and the alkaline earth and amine alkyl benzene sulfonates having from about 9 to about 18 carbon atoms in the alkyl chain, with from about 10 to about 14 carbon atoms being preferred. Examples of alkyl aromatic sulfonic acids from which these compounds are derived are dodecyl benzene sulfonic acid, dodecyl phenol sulfonic acid, di-hexyl benzene sulfonic acid, nonyl benzene sulfonic acid, keryl benzene sulfonic acid, tridecyl benzene sulfonic acid, dinonylnaphthalene sulfonic acid, nonyl naphthalene sulfonic acid and the like.

The above alkyl benzene sulfonic acids may be reacted with the alkaline earth oxides, hydroxides or salts, or with amines such as methylamine, ethylamine, propylamine, isopropylamine, butylamine, isobutylamine, amylamine, cyclohexylamine, ethanolamine, diethanolamine, diethylamine, dibutylamine, and dicyclohexylamine. Particularly good results may be obtained when using the alkyl-ammonium dodecyl benzene sulfonates, such as n-methylbutyl ammonium dodecylbenzene sulfonate, isopropyl ammonium dodecylbenzene sulfonate, and the like.

Although it is not an absolute requirement in all cases, the concentrates contemplated by the present invention may include a carrier solvent such as benzene, kerosene, or a diethylene glycol monoethyl ether such as "Carbitol." However, it should be understood that other carrier solvents, which are generally known and used in the preparation of agricultural concentrates, are also applicable in the present invention.

In the preparation of the non-ionic portion of the present emulsifier, separate portions of the same alkyl phenol or fatty alcohol, or different alkyl phenols or fatty alcohols, are condensed by known methods with an alkylene oxide to form separate portions of alkyl or alkyl aryl polyoxyalkylene glycol ethers or esters which are alkoxylated to different degrees. The difference in the percentage of alkoxylation should be at least 5 percent, with a difference in percent alkoxylation of about 10 percent to about 20 percent being preferred. Either of the portions may be alkoxylated to a percentage of about 50 percent to about 90 percent, and preferably 60 percent to 80 percent, with the remaining portion differing in percent alkoxylation by the above-stated differences.

In preparing the emulsifier of the present invention, a mixture of the two portions of alkyl or alkyl aryl polyoxyalkylene glycol ethers or esters alkoxylated to different levels is mixed with a portion of the above-described alkyl aromatic sulfonates. The non-ionic portions are combined in a ratio of about 1:5 to about 5:1, with preferred results being obtained using ratios of about 3:2 to about 2:3. Best results have ordinarily been obtained with a ratio of about 1:1. This mixture of non-ionics is combined with the alkyl aromatic sulfonate in a ratio of about 1:1 to about 3:1, and preferably about 1:1 to about 2:1. A ratio of non-ionic to anionic of about 1.2:1 has been found to be superior for many purposes.

It should be understood that in the preparation of the above emulsifier, other ingredients, such as additional nonionics and anionics may be added to the emulsifier without adversely affecting the superior results obtained. However, it is critical that the above described mixture of nonionics and at least one anionic be present in order to obtain the ternary synergistic results which have been observed.

Agricultural toxicant concentrates are readily prepared by mixing the present emulsifier with the toxicant to be dispersed, and optionally with a carrier solvent. Although a carrier solvent is generally used, and often required, such carrier solvent is not always absolutely necessary. The need for a carrier solvent will be readily determinable by one skilled in the art. Although the percentages of these components will necessarily vary according to the particular components employed and with the different conditions under which the concentrate will be used, use of compositions of certain percentage ranges yield more desirable results. As a general rule, the concentrate should contain from about 2 to about 10 parts by volume of emulsifier, from about 15 to about 90 parts of toxicant and from about 10 to about 80 parts of carrier solvent. Concentrates yielding the best results usually contain from about 3 to about 5 parts of emulsifier, about 30 to about 60 parts of toxicant and about 40 to about 70 parts of carrier solvent. In addiiton to the above components, the concentrate may also contain additional materials which do not adversely affect the performance of the concentrate, for example moisture scavengers, stabilizers, and the like.

In the application of the toxicant to the material to be treated, the above described concentrate may be added to a volume of water to readily form an aqueous dispersion which does not separate upon standing. The volume of concentrate used in a given volume of water is largely at the discretion of the user, with factors such as operating conditions and the particular type concentrate being used taken into consideration. Generally, however, an aqueous solution containing from about 2 percent to about 10 percent of concentrate has been found to be satisfactory under most conditions. Preferred results are ordinarily obtained using solutions containing from about 3 percent to about 5 percent of concentrate.

The following examples are presented for the purpose of illustration only and are not to be construed as limiting the scope of the invention:

Example I

Two 15 gram portions of nonyl phenol were ethoxylated to levels of 55 percent and 75 percent respectively by passing a 10% solution of ethylene oxide in dry nitrogen into the nonyl phenol at a temperature of 190° C. in the presence of 0.2% sodium acetate. An emulsifier mixture then prepared using these non-ionics by combining 4 parts by volume of the 55 percent ethoxylated nonyl phenol, 5 parts of the 75 percent ethoxylated nonyl phenol and 8 parts of n-methylbutylammonium, dinonyl napthalene sulfonate; and added to 7 parts "Butyl Cellosolve", i.e. ethylene glycol monobutyl ether, solvent.

Example II

Two 20 gram portions of dinonyl phenol and 1,1,3,3-tetramethylbutyl phenol, i.e. octyl phenol, were propoxylated to a level of 20% and then ethoxylated to levels of 67 percent and 74 percent respectively by the method described in Example I. An emulsifier mixture was prepared using these non-ionics by combining 3 parts by volume of the 67 percent ethoxylated dinonyl phenol, 3 parts of the 74 percent ethoxylated octyl phenol and 10 parts of a 50% solution of calcium dodecyl benzene sulfonate in methanol.

Example III

A toxicant concentrate was prepared by combining 5 parts of the emulsifier described in Example I with 40 parts of 2,4,5 T butyl ester and 55 parts of aromatic naptha. An aqueous solution containing 3 percent of this concentrate proved to be superior to a solution which was prepared in the same manner using an emulsifier containing 9 parts of 65 percent ethoxylated nonyl phenol instead of the non-ionic mixture described above.

Example IV

A concentrate was prepared using 7 parts of the emulsifier prepared as in Example II, 40 parts of Phosdrin and 53 parts of xylene. A solution of 3 percent of this concentrate in water showed noticeably improved properties over a solution prepared using an emulsifier which contained 6 parts of a single ethoxylated phenol, i.e. 71 percent ethoxylated dodecyl phenol.

Obviously, many modifications and variations of the invention as hereinbefore set forth may be made without departing from the spirit and scope thereof, and, therefore, only such limitations should be imposed as are indicated in the appended claims.

I claim:
1. A method for preparing an emulsifier for agricultural toxicants comprising: alkoxylating separate portions of fatty alcohols having from 8 to 22 carbon atoms, the first portion being alkoxylated to from about 50 to about 90 percent and another portion being alkoxylated to a percentage differing from the percentage of the first portion by at least 5 percent; combining the reactants in a ratio from about 1:5 to about 5:1 and mixing in a ratio from about 1:1 to about 3:1 with a sulfonate having from about 9 to about 18 carbon atoms in the alkyl chain and selected from the group consisting of mahogany sulfonates, alkaline earth sulfonates, amine alkyl benzene sulfonates, alkyl naphthalene sulfonates and polyalkyl benzene sulfonates.

2. The method of claim 1 wherein either portion of the fatty alcohol is alkoxylated from about 60 to about 80 percent, and the combined reactants are mixed with a sulfonate in a ratio of from about 1:1 to about 1.2:1.

3. The method of claim 1 wherein the sulfonate contains from about 10 to about 14 carbon atoms.

4. The method of claim 1 wherein either portion of the fatty alcohol is alkoxylated from about 55 to about 80 percent and the difference in the percentage of the alkoxylation between the separate portions of the fatty alcohols ranges from about 10 to about 20 percent.

5. The method of claim 1 wherein the alcohol is tallow alcohol.

6. The method of claim 1 wherein the alcohol is oleyl alcohol.

7. The method of claim 1 wherein the fatty alcohol portions are combined in a ratio from about 3:2 to about 2:3, and the combined reactants are mixed with the sulfonate in a ratio from about 1:1 to about 2:1.

8. The emulsifier as produced by the method of claim 1.

References Cited

UNITED STATES PATENTS 2,872,368  2/1959  Sanders et al. _____ 252—353
3,102,070  8/1963  Riley et al. _____ 252—353

LEON D. ROSDOL, *Primary Examiner.*

B. BETTIS, *Assistant Examiner.*

U.S. Cl. X.R.

252—358